(12) United States Patent
Smolyaninov et al.

(10) Patent No.: US 8,509,578 B2
(45) Date of Patent: Aug. 13, 2013

(54) ANISOTROPIC METAMATERIALS EMULATED BY TAPERED WAVEGUIDES: APPLICATION TO ELECTROMAGNETIC CLOAKING

(75) Inventors: Igor I. Smolyaninov, Columbia, MD (US); Vera N. Smolyaninova, Columbia, MD (US); Alexander V. Kildishev, West Lafayette, IN (US); Vladimir M. Shalaev, West Lafayette, IN (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 505 days.

(21) Appl. No.: 12/773,528

(22) Filed: May 4, 2010

(65) Prior Publication Data
US 2010/0278481 A1  Nov. 4, 2010

Related U.S. Application Data

(60) Provisional application No. 61/175,204, filed on May 4, 2009.

(51) Int. Cl.
*G02B 6/32* (2006.01)
*G02B 6/10* (2006.01)

(52) U.S. Cl.
USPC .............................. 385/33; 385/35; 385/131

(58) Field of Classification Search
USPC ............... 385/33, 35, 131; 359/642, 664, 359/641
See application file for complete search history.

(56) References Cited

PUBLICATIONS

"Broadband invisibility by non-Euclidean cloaking," by Leonhardt et al, Science, vol. 323, pp. 110-112, Jan. 2, 2009.*
"Plasmonic and metamaterial cloaking: physical mechanisms and potentials," by Alu et al, Journal of Optics A:Pure and Applied Optics, vol. 10, 093002-1 through 093002-17, Aug. 2008.*
"Multifrequency optical invisibility cloak with layered plasmonic shells," by Alu et al, Physical Review Letters, vol. 100, No. 11, pp. 113901-1 through 113901-4, Mar. 2008.*
J.B. Pendry, D. Schurig, D.R. Smith, "Controlling electromagnetic fields", Science 312, 1780-1782 (2006).
U. Leonhardt, "Optical conformal mapping", Science 312, 1777-1780 (2006).
A. Greenleaf, M. Lassas, G. Uhlmann, "The Calderon problem for conormal potentials—I: Global uniqueness and reconstructions", Communications on Pure and Applied Mathematics 56, 328-352 (2003).
A. Alu, N. Engheta, "Cloaking and transparency for collections of particles with metamaterial and plasmonic covers", Optics Express 15, 7578-7590 (2007).
W. Cai, U.K. Chettiar, A.V. Kildishev, V.M. Shalaev, "Optical cloaking with metamaterials", Nature Photonics 1, 224-227 (2007).

(Continued)

*Primary Examiner* — Mark Robinson
*Assistant Examiner* — Robert Tavlykaev
(74) *Attorney, Agent, or Firm* — Daniel J. Long

(57) ABSTRACT

A method for carrying out electromagnetic cloaking using metamaterial devices requiring anisotropic dielectric permittivity and magnetic permeability may be emulated by specially designed tapered waveguides. This approach leads to low-loss, broadband performance in the visible frequency range, which is difficult to achieve by other means. We apply this technique to electromagnetic cloaking. A broadband, two-dimensional, electromagnetic cloaking is demonstrated in the visible frequency range on a scale ~100 times the wavelength. Surprisingly, the classic geometry of Newton rings is suited for an experimental demonstration of this effect.

5 Claims, 4 Drawing Sheets

(56) References Cited

PUBLICATIONS

W. Cai, U.K. Chettiar, A.V. Kildishev, V.M. Shalaev, G.W. Milton, "Nonmagnetic cloak with minimized scattering", Appl. Phys. Lett. 91, 111105 (2007).

Z. Jacob, E.E. Narimoanov, "Semiclassical description of non magnetic cloaking", Optics Express 16, 4597-4604 (2008).

D. Schurig, J.J. Mock, B.J. Justice, S.A. Cummer, J.B. Pendry, A.F. Starr, D.R. Smith, "Metamaterial electromagnetic cloak at microwave frequencies", Science 314, 977-980 (2006).

I.I. Smolyanivov, Y.J. Hung, C.C. Davis, "Two-dimensional metamaterial structure exhibiting reduced visibility at 500 nm", Optics Letters 33, 1342-1344 (2008).

A. Greenleaf, Y. Kurylev, M. Lassas, G. Uhlmann, "Electromagnetic Wormholes and Virtual Magnetic Monopoles from Metamaterials", Physical Review Letters 99, 183901 (2007).

\* cited by examiner

ANISOTROPIC METAMATERIALS EMULATED BY TAPERED WAVEGUIDES: APPLICATION TO ELECTROMAGNETIC CLOAKING

CROSS-REFERENCE TO RELATED APPLICATIONS

This application claims rights under 35 U.S.C. §119 (e) from U.S. Application Ser. No. 61/175,204, filed May 4, 2009, the contents of which are incorporated herein by reference.

BACKGROUND OF THE INVENTION

1. Field of the Invention

The present invention relates to electromagnetic metamaterials and more particularly to applications of such materials in electromagnetic cloaking.

2. Brief Description of Prior Developments

Current interest in electromagnetic metamaterials has been motivated by recent work on cloaking and transformation optics as is disclosed in J. B. Pendry, D. Schurig, D. R. Smith, "Controlling electromagnetic fields", Science 312, 1780-1782 (2006); U. Leonhardt, "Optical conformal mapping", Science 312, 1777-1780 (2006); A. Greenleaf, M. Lassas, G. Uhlmann, "The Calderon problem for conormal potentials—I: Global uniqueness and reconstruction", Communications on Pure and Applied Mathematics 56, 328-352 (2003); and A. Alu, N. Engheta, "Cloaking and transparency for collections of particles with metamaterial and plasmonic covers", Optics Express 15, 7578-7590 (2007), the contents of which are incorporated herein by reference. This interest has been followed by considerable efforts aimed at the introduction of metamaterial structures that could be realized experimentally. Unfortunately, it appears difficult to develop metamaterials with low-loss, broadband performance. The difficulties are especially severe in the visible frequency range where good magnetic performance is limited. While interesting metamaterial devices have been suggested based on non-magnetic designs as is disclosed in W. Cai, U. K. Chettiar, A. V. Kildishev, V. M. Shalaev, "Optical cloaking with metamaterials", Nature Photonics 1, 224-227 (2007); W. Cai, U. K. Chettiar, A. V. Kildishev, V. M. Shalaev, G. W. Milton, "Nonmagnetic cloak with minimized scattering", Appl. Phys. Lett. 91, 111105 (2007); and Z. Jacob, E. E. Narimanov, "Semiclassical description of non magnetic cloaking", Optics Express 16, 4597-4604 (2008), the contents of which are incorporated herein by reference, the development of anisotropic magnetic metamaterials for the visible range would be highly desirable. Other limitations of "traditional" metamaterials in any portion of the electromagnetic spectrum are high losses and narrowband performance. These limitations may be once again illustrated using cloaking as an example. Despite considerable theoretical effort, there exist only a few experimental demonstrations performed in rather narrow frequency ranges. The first experimental realization of an electromagnetic cloak in the microwave frequency range was reported in a two-dimensional cylindrical waveguide geometry as is disclosed in D. Schurig, J. J. Mock, B. J. Justice, S. A. Cummer, J. B. Pendry, A. F. Starr, D. R. Smith, "Metamaterial electromagnetic cloak at microwave frequencies", Science 314, 977-980 (2006), the contents of which are incorporated herein by reference. In addition, a plasmonic metamaterial structure exhibiting reduced visibility at 500 nm has been demonstrated as is disclosed in I. I. Smolyaninov, Y. J. Hung, C. C. Davis, "Two-dimensional metamaterial structure exhibiting reduced visibility at 500 nm", Optics Letters 33, 1342-1344 (2008), the contents of which are incorporated herein by reference. In both experimental demonstrations, the dimensions of the "cloaked" area were comparable with the wavelength of the incident electromagnetic radiation, meaning that the shadow produced by an uncloaked object of the same size would not be pronounced anyway in these cases.

A need, therefore, exists for a way to further improve electromagnetic materials in using metamaterials.

SUMMARY OF INVENTION

According to the present invention, many metamaterial devices requiring anisotropic dielectric permittivity and magnetic permeability could be emulated by specially designed tapered waveguides. This approach leads to low-loss, broadband performance in the visible frequency range, which is difficult to achieve by other means. We apply this technique to electromagnetic cloaking. We demonstrate broadband, two-dimensional, electromagnetic cloaking in the visible frequency range on a scale roughly 100 times larger than that of the incident wavelength.

BRIEF DESCRIPTION OF THE DRAWINGS

The present invention is further described with reference to the accompanying drawings wherein.

DETAILED DESCRIPTION OF THE PREFERRED EMBODIMENT

Figure 1A:
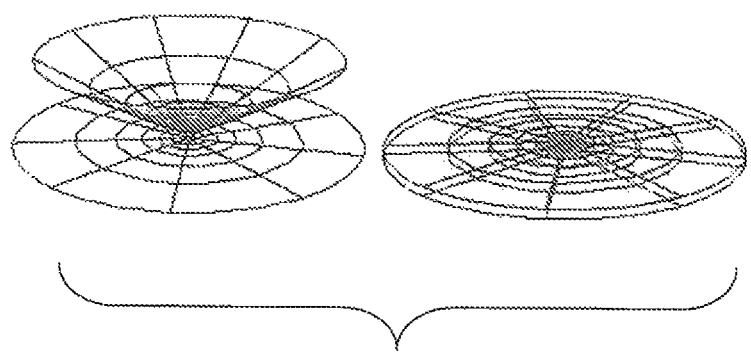
FIGS. 1A, 1B and 1C are a series of graphs showing the transformation optics approach permits the mapping of an arbitrary empty axisymmetric domain (left) onto a space between two planes (right) filled with a metamaterial characterized by non-uniform, anisotropic and axisymmetric $\tilde{\varepsilon}$ and $\tilde{\mu}$ tensors. (b) a space between a spherical and a planar surfaces (top) mapped to a planar layer (bottom), s=1. (c) distribution of the radial (top), azimuthal (middle), and axial (or vertical) diagonal components of permittivity and permeability in the equivalent planar waveguide ($\tilde{\varepsilon}=\tilde{\mu}$)

As a starting point, we show that the transformation optics approach allows us to map a planar region of space (a waveguide) filled with inhomogeneous, anisotropic metamaterial into an equivalent region of empty space with curvilinear boundaries. This mapped region could be a planar wedge waveguide or a circular waveguide, for example. We begin by considering the following formal (material) notation for Maxwell's curl equations as is described in A. V. Kildishev, W. Cai, U. K. Chettiar, V. M. Shalaev, "Transformation optics: approaching broadband electromagnetic cloaking", *New Journal of Physics* 10, 115029 (2008), the contents of which are incorporated herein by reference:

$$\tilde{\nabla}\times\tilde{H}=-i\omega\tilde{\in}\tilde{E}, \tilde{\nabla}\times\tilde{E}=i\omega\tilde{\mu}\tilde{H}, \quad (1)$$

for vector fields $\tilde{E}=\Sigma\tilde{e}_i\tilde{x}_i$ and $\tilde{H}=\Sigma\tilde{h}_i\tilde{x}_i$ in an orthogonal curvilinear system with the unit vectors $\tilde{x}_1$, $\tilde{x}_2$, and $\tilde{x}_3$. The components of the actual physical fields $E=\Sigma e_i\tilde{x}_i$ and $H=\Sigma h_i\tilde{x}_i$ are connected with the vectors in the material coordinates, $\tilde{E}$ and $\tilde{H}$, through $e_i=\tilde{e}_i\tilde{s}_i^{-1}$ and $h_i=\tilde{h}_i\tilde{s}_i^{-1}$ using the metric coefficients, $s_1$, $s_2$, and $s_3$. The tensors $\tilde{\in}$ and $\tilde{\mu}$ given by $t\in$ and $t\mu$, with t being $t=s_1s_2s_3\text{diag}(s_1^{-2}, s_2^{-2}, s_3^{-2})$. This description formally links the curvilinear components $e_i$ and $h_i$ in the domain characterized by anisotropic material parameters made of diagonal tensors $\in$ and $\mu$ to the components $\tilde{e}_i$ and $\tilde{h}_i$ in a formal, Cartesian domain characterized by non-uniform, anisotropic $\tilde{\in}$ and $\tilde{\mu}$. However, a Cartesian domain is not beneficial for comparing confined, rotationally symmetric material systems encapsulated within axisymmetric coordinate surfaces. For comparing axisymmetric cloaking and imaging systems, it is much more practical to match a given axisymmetric material domain to an equivalent inhomogeneous axisymmetric material distribution between two planes in the classical circular cylinder coordinate system, as shown in FIG. 1a. The transformation optics approach allows us to achieve this in a similar manner.

The metric coefficients are $s_\rho=s_z=1$, $s_\phi=\rho$. Therefore, $\rho e_\phi=\tilde{e}_\phi$, $\rho h_\phi=\tilde{h}_\phi^2$, and $e_i=\tilde{e}_i$, $h_i=\tilde{h}_i$ for $i=\rho$, z. Thus, any rotational coordinate system $(\tilde{\rho},\tilde{\phi},\tilde{z})$ converted into the cylindrical format $$\tilde{\nabla}\times\tilde{H}=-i\omega\text{diag}(\tilde{\rho},\tilde{\rho}^{-1},\tilde{\rho})\tilde{\in}\tilde{E}, \tilde{\nabla}\times\tilde{E}=i\omega\text{diag}(\tilde{\rho},\tilde{\rho}^{-1},\tilde{\rho})\tilde{\mu}\tilde{H} \quad (2)$$

is equivalent to a classical circular cylinder coordinate system with material tensors $\tilde{\in}$ and $\tilde{\mu}$.

Figure 1B:
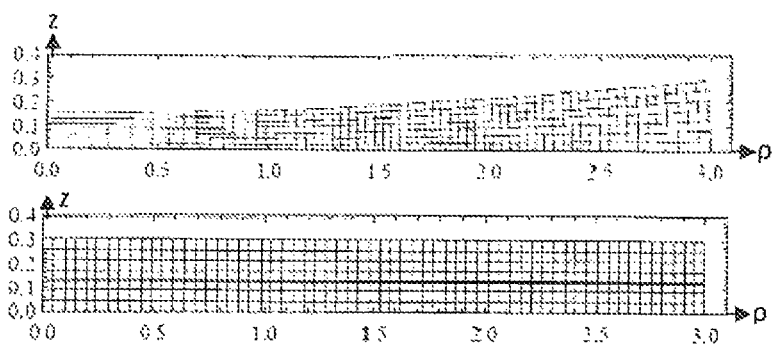

Let us now consider an interesting application of the formalism above, which will lead us to an experimental demonstration of electromagnetic cloaking. We map an axisymmetric space between two spherical surfaces onto a space between two planes. The parametric description, $$s^2 = (z-z_0)^2 + \rho^2, \quad (3)$$

$$\rho = \frac{s\sqrt{(2s-\tilde{\rho})\tilde{\rho}}}{s-\tilde{\rho}+\sqrt{s^2+\tilde{z}^2}},$$

$$\rho = \frac{s\tilde{z}}{s-\tilde{\rho}+\sqrt{s^2+\tilde{z}^2}}$$

provides this 3D mapping (see FIG. 1b). Both coordinate systems share the same azimuthal parameterization ($\phi=\tilde{\phi}$). The tensors $\tilde{\in}$ and $\tilde{\mu}$ are now given by $t\in$ and $t\mu$, with t explicitly written as $$t = \tilde{s}_{\tilde{\rho}}\tilde{s}_{\tilde{\phi}}\tilde{s}_{\tilde{z}}\text{diag}(\tilde{\rho}^{-1}\tilde{s}_{\tilde{\rho}}^{-2}, \tilde{\rho}\tilde{s}_{\tilde{\phi}}^{-2}, \tilde{\rho}^{-1}\tilde{s}_{\tilde{z}}^{-2}).$$

Figure 1C:
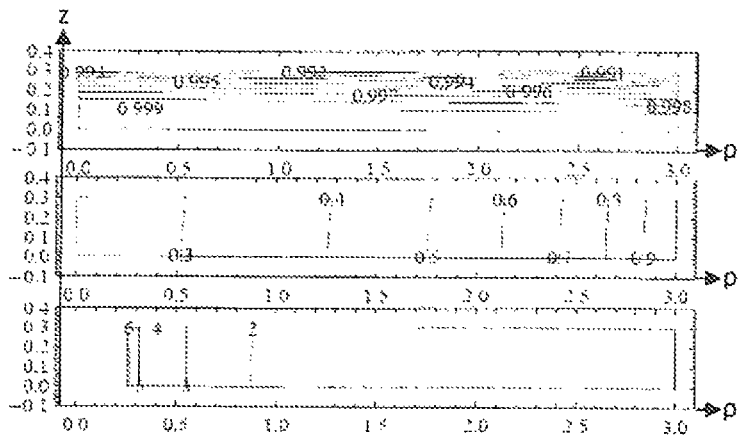

Then again, the transformation optics technique gives the diagonal components $$\tilde{\varepsilon}_{\tilde{\rho}} = \frac{s(2s-\tilde{\rho})}{a(a+s-\tilde{\rho})}, \quad (4)$$

$$\tilde{\varepsilon}_o = \frac{s^3}{a(a+s-\tilde{\rho})(2s-\tilde{\rho})},$$

$$\tilde{\varepsilon}_{\tilde{z}} = \frac{as}{\tilde{\rho}(a+s-\tilde{\rho})}$$

of the inhomogeneous anisotropic permittivity $\tilde{\in}$, as well as the anisotropic permeability tensor $\tilde{\mu}=\tilde{\in}$, distributed in an equivalent layer between two planes (where $a=\sqrt{s^2+\tilde{z}^2}$). Analysis of Eqs. (4) and FIG. 1(c) indicates that Eqs. (4) can be approximated with $$\tilde{\varepsilon}_{\tilde{\rho}} = \tilde{\mu}_{\tilde{\rho}} \approx 1, \quad (5)$$

$$\tilde{\varepsilon}_o = \tilde{\mu}_o \approx \frac{s^2}{(2s-\tilde{\rho})^2},$$

$$\tilde{\varepsilon}_{\tilde{z}} = \tilde{\mu}_{\tilde{z}} \approx \frac{s^2}{\tilde{\rho}(2s-\tilde{\rho})}.$$

Note that the requirement for an ideal cloak in the effective material coordinate system $(\tilde{\rho}, \tilde{\phi}, \tilde{z})$ should be written as is disclosed in A. V. Kildishev, W. Cai, U. K. Chettiar, V. M. Shalaev, "Transformation optics: approaching broadband electromagnetic cloaking", *New Journal of Physics* 10, 115029 (2008), the contents of which are incorporated herein by reference:

$$\tilde{\in}=\tilde{\mu}=\rho\tilde{\rho}'/\tilde{\rho}, \tilde{\in}_{\tilde{\phi}}=\tilde{\mu}_{\tilde{\phi}}=\tilde{\in}^{-1}, \tilde{\in}_{\tilde{z}}=\tilde{\mu}_{\tilde{z}}=\rho/(\tilde{\mu}'\tilde{\mu}), \quad (6)$$

where $\tilde{\rho}=\tilde{\rho}(\rho)$ is a radial mapping function and $\tilde{\rho}'=d\tilde{\rho}/d\rho$. In general, $\tilde{\in}\tilde{\in}_{\tilde{z}}=(\rho/\tilde{\rho})^2$. These requirements can be met if the refractive index $(n=\tilde{\in}^{1/2})$ inside the gap between the sphere and the plane is chosen to be a simple radius-dependent function $n=\sqrt{(2s-\tilde{\rho})/s}$. In such a case we obtain $$\tilde{\varepsilon}_{\tilde{\rho}} = \frac{2s-\tilde{\rho}}{s}, \quad (7)$$

$$\tilde{\varepsilon}_{\tilde{\sigma}} = \frac{s}{2s-\tilde{\rho}},$$

$$\tilde{\varepsilon}_{\tilde{z}} = \frac{s}{\tilde{\rho}}$$

Since in general $\tilde{\in}\tilde{\in}_{\tilde{z}}=(\rho/\tilde{\rho})^2$, we can recover the mapping function from (7) as $\rho(\tilde{\rho})=s\sqrt{\tilde{\rho}/(2s-\tilde{\rho})}$, which is consistent with the approximated version of the initial mapping shown in (3). Note that the scale s is chosen to avoid singularities: s>max($\tilde{\rho}$). Also note that Eqs. (7) represent the invisible body, i.e. a self-cloaking arrangement. It is also important that the filling substance has an isotropic effective refractive index ranging from 2 to 1 for $\rho=[0, s]$.

It is important to note that filling an initial domain between a rotationally symmetric curvilinear boundaries, for example, with anisotropic dielectric allows for independent control over the effective magnetic and electric properties in the equivalent right-cylinder domain. Thus, while the shape is controlling the general mapping and provides the identical transformations for the effective magnetic and electric components, further independent adjustment of material tensors $\tilde{\in}$ and $\tilde{\mu}$ could be achieved through either anisotropic magnetic or (which is more realistic for optics) anisotropic electric filling.

It is also interesting that in the semi-classical ray-optics approximation, the cloaking geometry may be simplified even further for a family of rays with similar parameters. This simplification lets us clearly demonstrate the basic physics involved. Our starting point is the semi-classical 2D cloaking Hamiltonian (dispersion law) introduced in [6]:

$$\frac{\omega^2}{c^2} = k_r^2 + \frac{k_\phi^2}{(r-b)^2} = k_r^2 + \frac{k_\phi^2}{r^2} + k_\phi^2 \frac{b(2r-b)}{(r-b)^2 r^2}. \quad (8)$$

Figure 2A:
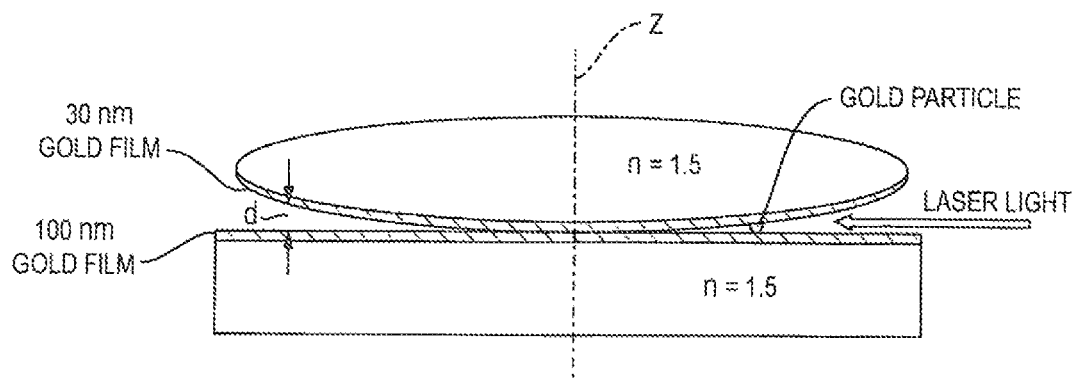
FIGS. 2A and 2B are graphs showing waveguide geometry that emulates the cloaking Hamiltonian. (b) geometrical shape of the waveguide described by Eq. (4) dL/m combinations are plotted for a cloak radius of $b_{mL}$=50 µm. The shape of this "ideal" waveguide may be approximated by a spherical surface (60 µm diameter) placed on top of a flat surface, as shown by the dashed line.
Figure 2B:
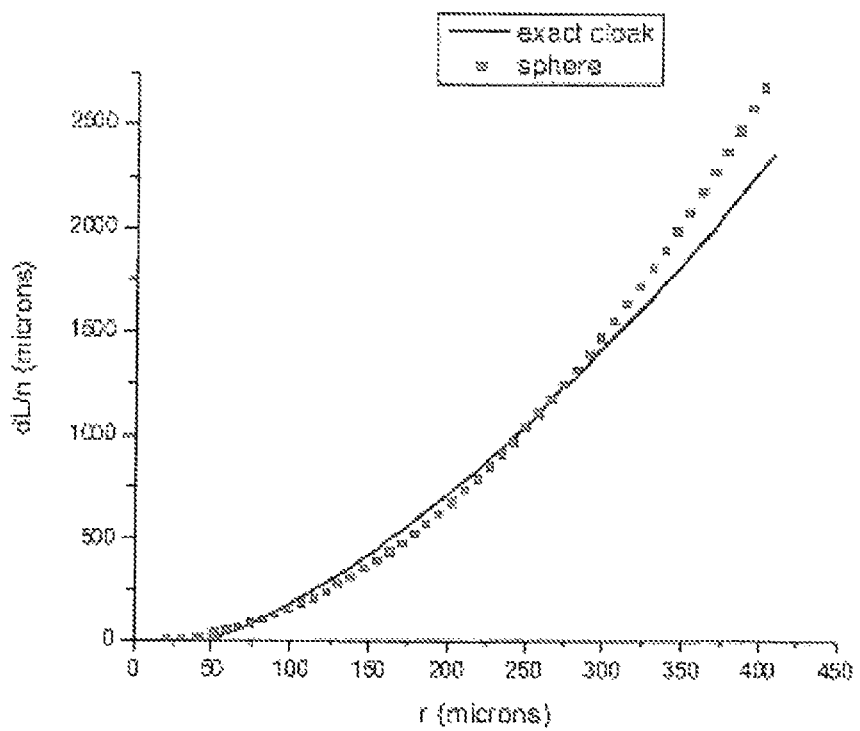

Jacob and Narimanov demonstrated that for such a cylindrically symmetric Hamiltonian, the rays of light would flow smoothly without scattering around a cylindrical cloaked region of radius b. Our aim is to produce the cloaking Hamiltonian (8) in an optical waveguide (FIG. 2). Let us allow the thickness d of the waveguide in the z-direction to change adiabatically with radius r. The top and bottom surfaces of the waveguide are coated with metal. The dispersion law (Hamiltonian) of light in such a waveguide is $$\frac{\omega^2}{c^2} = k_r^2 + \frac{k_\phi^2}{r^2} + \frac{\pi^2 m^2}{d(r)^2}, \quad (9)$$

where m is the transverse mode number. Note that a photon launched into the m-th mode of the waveguide stays in this mode as long as d changes adiabatically, as is described in L. D. Landau, E. M Lifshitz, Quantum Mechanics (Reed, Oxford, 1988), the contents of which are incorporated herein by reference. In addition, since the angular momentum of the photon $k_\phi = \rho k = L$ is conserved (where $\rho$ is the impact parameter defined with respect to the origin), for each combination of in and L the cloaking Hamiltonian (8) can be emulated precisely by an adiabatically changing d(r). A comparison of Eqs. (8) and (9) produces the following desired radial dependence of the waveguide thickness:

$$d = \frac{m\pi r^{3/2}\left(1 - \frac{b_{mL}}{r}\right)}{L\left(2b_{mL}\left(1 - \frac{b_{mL}}{r}\right)\right)^{1/2}}, \quad (10)$$

where $b_{mL}$ is the radius of the region that is "cloaked" for the photon launched into the (m,L) mode of the waveguide. The shape of such a waveguide is presented in FIG. 2(b). In this figure we have chosen $b_{mL}=50$ μm. Thus, an electromagnetic cloaking experiment in a waveguide may be performed in a geometry that is identical to the classic geometry of the Newton rings observation as is described in I. Newton, "A letter of Mr. Isaac Newton, Professor of the Mathematicks in the University of Cambridge; containing his new theory about light and colors", *Phil. Trans. of the Royal Soc.* 80, 3075-3087 (1671), the contents of which are incorporated herein by reference, as shown in FIG. 2(a). An aspherical lens shaped according to Eq. (10) has to be used for the single (m,L) mode cloak to be ideal. It appears also that the shape of the "ideal" waveguide may be reasonably approximated by a spherical surface placed on top of a flat surface, as shown by the dashed line in FIG. 2 (b). Moreover, the waveguide geometry for a single cloaking mode may be further improved to allow cloaking in a multi-mode waveguide geometry. It is clear from Eq. (10) that the choice of $$b_{mL} = b_o \frac{m^2}{L^2}$$

leads to the same desired shape of the waveguide for all the (m,L) modes of a multi-mode waveguide in the leading order of $b_{mL}/r$:

$$d = \pi \sqrt{\frac{r^3}{2b_O}}. \quad (11)$$

Equation (11) describes the best-shaped aspherical lens for the electromagnetic cloaking observation in the Newton rings geometry with an air gap.

Figure 3A:
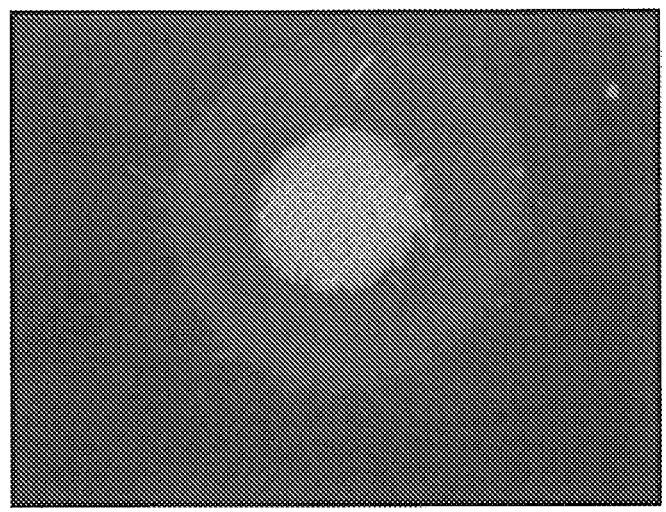
FIGS. 3A, 3B and 3C are a series of photographs showing microscope image of the waveguide illuminated with while light from the top. The Newton rings are visible in the centre of the field of view. (b) Microscope image of the waveguide with a gold particle placed inside and illuminated with while light from the top. (c) A long shadow has been cast by the gold particle upon coupling 515-nm laser light into the waveguide. The position of the particle edge is shown by the dashed line.
Figure 3B:
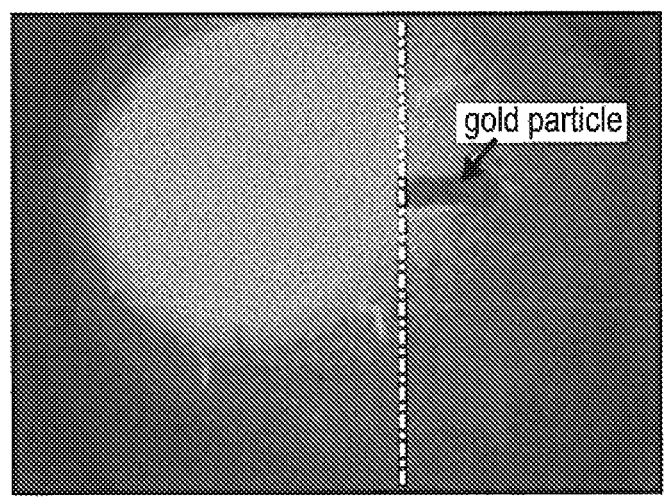
Figure 3C:
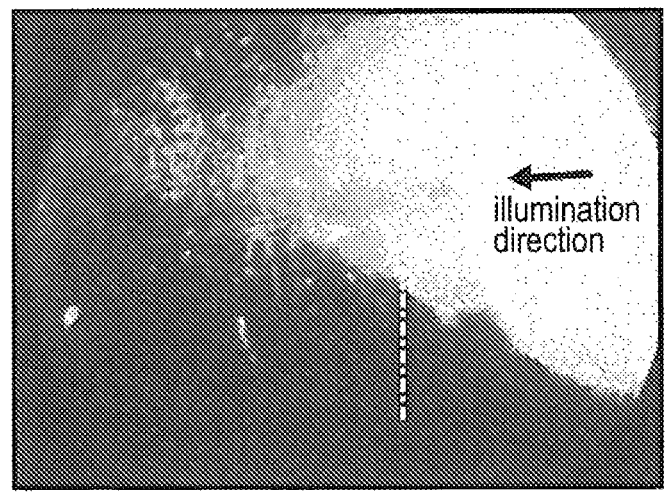

In our experiments, a 4.5-mm diameter double convex glass lens (lens focus 6 mm) from Edmund Scientific was coated on one side with a 30-nm gold film. The lens was placed with the gold-coated side down on top of a flat glass slide coated with a 70-nm gold film. The air gap between these surfaces has been used as an adiabatically changing waveguide. The point of contact between two gold-coated surfaces is clearly visible in FIG. 3(a). The Newton rings appear around the point of contact upon illumination of the waveguide with white light from the top. The radius of the m-th ring is given by the expression $r_m=((½+m)R\lambda)^{1/2}$, where R is the lens radius. The central area around the point of contact appears to be bright since light reflected from the two gold coated surfaces has the same phase. Laser light from an argon ion laser was coupled to the waveguide formed between two gold-coated surfaces via side illumination. Light propagation through the waveguide was imaged from the top using an optical microscope. FIGS. 3(b) and 3(c) show microscope images of the light propagation through the waveguide in an experiment in which a gold particle cut from a 50-μm diameter gold wire is placed inside the waveguide. A very pronounced long shadow is cast by the particle inside the waveguide (FIG. 3(c)). This result is quite natural since the gold particle size is approximately equal to 100λ (note that the first dark Newton ring visible in FIG. 3(a,b) has approximately the same size as the diameter of the gold wire). Since the gold particle is located ~400 μm from the point of contact between the walls of the waveguide, the effective Hamiltonian around the gold particle differs strongly from the cloaking Hamiltonian of Eq. (8). FIG. 3 represents the results of our best effort to insert a 150 μm long 50 μm diameter gold particle inside the waveguide and orient it along the illumination direction. A few scratches visible in FIG. 3 resulted from achieving this non-trivial experimental task.

Figure 4A:
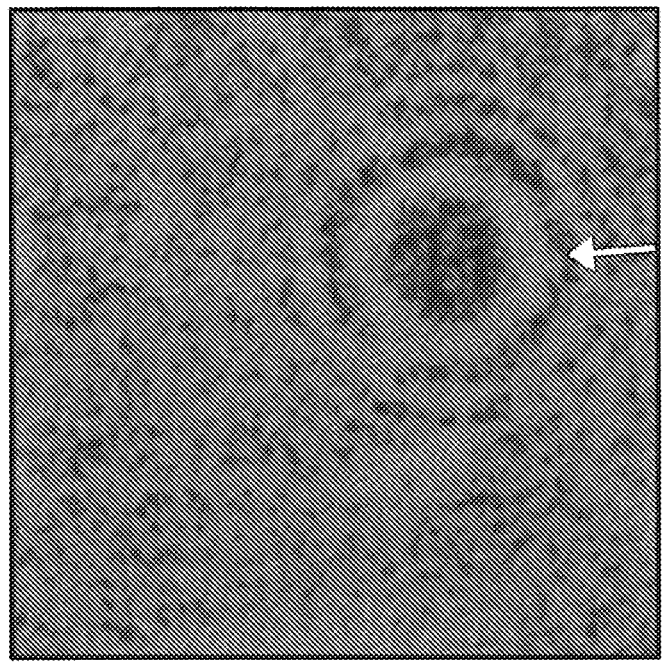
FIGS. 4A and 4B are photographs showing magnified images of the waveguide area around the point of contact upon coupling 515-nm (a) and 488-nm (b) laser light into the waveguide. The illumination direction is shown by the arrow.
Figure 4B:
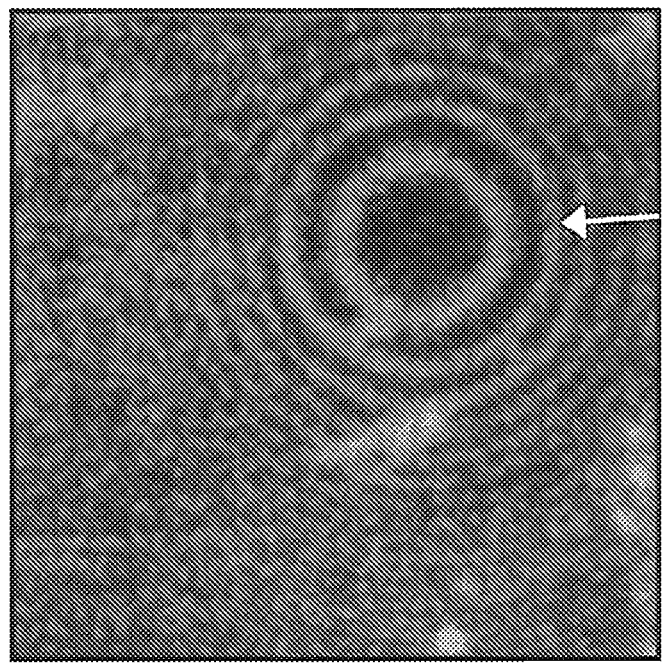

While the gold particle casts a long and pronounced shadow, it appears that the area around the point of contact between the two gold-coated surfaces casts no shadow at all (FIG. 4). This is an observation which would be extremely surprising in the absence of the theoretical description presented above. For the m-th mode of the waveguide shown in FIG. 2(a), the cut-off radius is given by the same expression as that of the radius of the m-th Newton ring: $r_m=((½+m)R\mu)^{1/2}$, which means that no photon launched into the waveguide can reach an area within the radius $r_0=(R\lambda/2)^{1/2}$, or approximately 30 μm from the point of contact between the two gold-coated surfaces. This is consistent with the fact that the area around the point of contact appears dark in FIG. 4. Even though some photons may couple to surface plasmon polaritons as is disclosed in A. V. Zayats, I. I. Smolyaninov, A. Maradudin, "Nano-optics of surface plasmon-polaritons", *Physics Reports*, 408, 131-314 (2005), the contents of which are incorporated herein by reference, near the cut-off point of the waveguide, the propagation length of the surface plasmons at 515 nm is only a few micrometers. Thus, the area around the point of contact about 50 µM in diameter is about as opaque for guided photons as the ~50 µm gold particle from FIG. 3(*b,c*), which casts a pronounced, long shadow. Nevertheless, there appears to be no shadow behind the cut-off area of the waveguide (see the images in FIG. 4(*a,b*), which were taken at the 488-nm and 515-nm laser lines of the argon ion laser). The observed cloaking behavior appears to be broadband, which is consistent with the theory presented above. It is also interesting to note that the geometry of our cloaking experiment is similar to the geometry recently proposed in U. Leonhardt. T. Tyc, "Broadband invisibility by non-euclidean cloaking", *Science* 323, 110-112 (2009), the contents of which are incorporated herein by reference.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for carrying out electromagnetic cloaking comprising a step of using a tapered plasmonic waveguide to achieve broadband, two-dimensional electromagnetic cloaking in a visible frequency range by adiabatically varying a gap d of said tapered waveguide, wherein said tapered waveguide guides light within space defined by two surfaces that contact each other at a point and have the gap d therebetween described by the following equation $$d = \frac{m\pi r^{3/2}\left(1 - \frac{b_{mL}}{r}\right)}{L\left(2b_{mL}\left(1 - \frac{b_{mL}}{r}\right)\right)^{1/2}},$$

wherein r is a radial distance from the point of contact, $b_{mL}$ is a cloak radius, and m and L are mode numbers corresponding to a waveguide mode.

2. The method of claim 1 wherein there is an incident wavelength and cloaking is achieved on a scale of about a hundred times larger than the incident wavelength.

3. The method of claim 1 wherein a metamaterial device having anisotropic permittivity is emulated.

4. The method of claim 1 wherein a metamaterial device having magnetic permeability is emulated.

5. The method of claim 1 wherein one of said two surfaces defining said tapered waveguide is a flat surface.

\* \* \* \* \*